(12) United States Patent
Sawada et al.

(10) Patent No.: US 7,959,232 B2
(45) Date of Patent: Jun. 14, 2011

(54) SEAT FRAME STRUCTURE AND METHOD FOR A CONNECTING SEAT AND A SEAT FRAME

(75) Inventors: Tamotsu Sawada, Isehara (JP); Mitsugu Udagawa, Yamato (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 255 days.

(21) Appl. No.: 11/803,067

(22) Filed: May 11, 2007

(65) Prior Publication Data

US 2007/0262630 A1  Nov. 15, 2007

(30) Foreign Application Priority Data

May 12, 2006  (JP) ................................. 2006-133737
Apr. 4, 2007  (JP) ................................. 2007-098721

(51) Int. Cl.
*A47C 7/00* (2006.01)

(52) U.S. Cl. ......... 297/440.16; 297/440.15; 297/440.21; 297/16.2

(58) Field of Classification Search ............ 297/440.15, 297/440.16, 440.2, 440.21, 440.22, 16.2, 297/248, 452.39
See application file for complete search history.

(56) References Cited

U.S. PATENT DOCUMENTS

| | | | | |
|---|---|---|---|---|
| 2,630,858 A * | 3/1953 | Bellin | ....................... | 297/440.21 |
| 2,765,580 A * | 10/1956 | Herrschaft | .................... | 446/119 |
| 3,580,620 A * | 5/1971 | Offenbroich | .................. | 403/239 |
| 4,199,189 A * | 4/1980 | Neumann | .................... | 297/451.8 |
| 5,238,285 A | 8/1993 | Holdampf et al. | | |
| 5,711,577 A * | 1/1998 | Whalen | ....................... | 297/361.1 |
| 5,826,944 A * | 10/1998 | Beneker et al. | ............. | 297/440.2 |
| 6,322,148 B1 * | 11/2001 | Kolena et al. | ............... | 297/452.2 |
| 6,543,855 B2 * | 4/2003 | Bruck | ....................... | 297/440.21 |
| 2005/0057082 A1 | 3/2005 | Hatta et al. | | |
| 2006/0152058 A1 | 7/2006 | Pejathaya et al. | | |

FOREIGN PATENT DOCUMENTS

| | | |
|---|---|---|
| JP | 2602770 | 1/1997 |
| WO | 2004026622 A1 | 4/2004 |
| WO | 2005095150 A1 | 10/2005 |

OTHER PUBLICATIONS

Patent Abstracts of Japan for Japanese Publication No. 06-100130, Publication date Apr. 12, 1994 (2 pages).
European Search Report for European Application No. 07107985.9-2424, dated Feb. 11, 2010 (7 pages).
Office Action for European Application No. 07107985.9-2424, dated Oct. 12, 2010 (7 pages).

* cited by examiner

*Primary Examiner* — David Dunn
*Assistant Examiner* — David E Allred
(74) *Attorney, Agent, or Firm* — Osha • Liang LLP

(57) ABSTRACT

A seat frame structure includes a seat cushion frame, a seat back frame, and a connecting bracket connecting the seat cushion frame to the seat back frame. The seat cushion frame includes a first beam portion having an internal space in at least one of a left/right side edge portion. The seat back frame includes a second beam portion having an internal space in at least one of a left/right side edge portion. The connecting bracket includes a first arm portion inserted into the internal space of the first beam portion and connected to the first beam portion and a second arm portion inserted into the internal space of the second beam portion and connected to the second beam portion.

13 Claims, 11 Drawing Sheets

SEAT FRAME STRUCTURE AND METHOD FOR A CONNECTING SEAT AND A SEAT FRAME

PRIORITY APPLICATION

This application claims priority from Japanese Patent Application No. 2006-133737, filed May 12, 2006, and Japanese Application No. 2007-098721, filed Apr. 4, 2007, the contents of which are hereby incorporated by reference in their entirety.

TECHNICAL FIELD

The present invention relates to a type of seat frame structure set in a type of seat having a seat cushion and a seat back, as well as a method for connecting the seat and seat frame.

BACKGROUND

In the related art, for a seat having a seat back and a seat cushion, especially, for a seat for vehicle use, a seat back frame is formed in a sheet (panel) shape. A peripheral edge portion of the seat back frame is wound up into continuous pipe shape (pipe shape) by a curling processing of the peripheral edge portion. An example is disclosed in Japanese Utility Model Registration No. 2602770 (hereinafter "Patent Reference 1").

The connecting structure between the seat back frame and seat cushion frame is not disclosed in Patent Reference 1. By means of a pair of left/right connecting brackets set along the outer side surface of the seat back frame and the seat cushion frame, the frames are connected to each other. However, for such a connecting structure, the connecting bracket is positioned on the side of the seat back frame and the seat cushion frame, such that the pads and leg members are restricted by the connecting bracket, and other installed parts installed on the seat back frame and seat cushion frame.

SUMMARY OF THE INVENTION

In accordance with embodiments of the present invention, a seat frame structure includes a seat cushion frame, a seat back frame, and a connecting bracket connecting the seat cushion frame to the seat back frame. The seat cushion frame includes a first beam portion having an internal space in at least one of a left/right side edge portion. The seat back frame includes a second beam portion having an internal space in at least one of a left/right side edge portion. The connecting bracket includes a first arm portion inserted into the internal space of the first beam portion and connected to the first beam portion and a second arm portion inserted into the internal space of the second beam portion and connected to the second beam portion.

Other aspects and advantages of the invention will be apparent from the following description and the appended claims.

DETAILED DESCRIPTION

In FIGS. 1-8, a seat frame structure, and components thereof, is shown in accordance with an embodiment of the present invention. In the embodiment shown in FIGS. 1-8, the seat frame structure is for the seat of a vehicle. More specifically, the seat frame structure of the rear bench seat for 2-3 persons to sit in a one-box design car body. Those having ordinary skill in the art will appreciate that aspects of the seat frame structure may be adapted to additional seat designs in other types of car bodies, such as, for example, a cab-forward design car body, without departing from the scope of the present invention.

In the following description, relative directions are used to describe the location and direction of components. As used herein, "forward" and "front" refer to the direction that an occupant of the seat would normally face, and "rearward" and "rear" refer to the opposing direction. "Left/right" refers to a direction perpendicular to the direction that the occupant of the seat would normally face. "Up/down" refers to the vertical direction, with down being towards the occupant's feet and up being towards the occupant's head.

Figure 1:
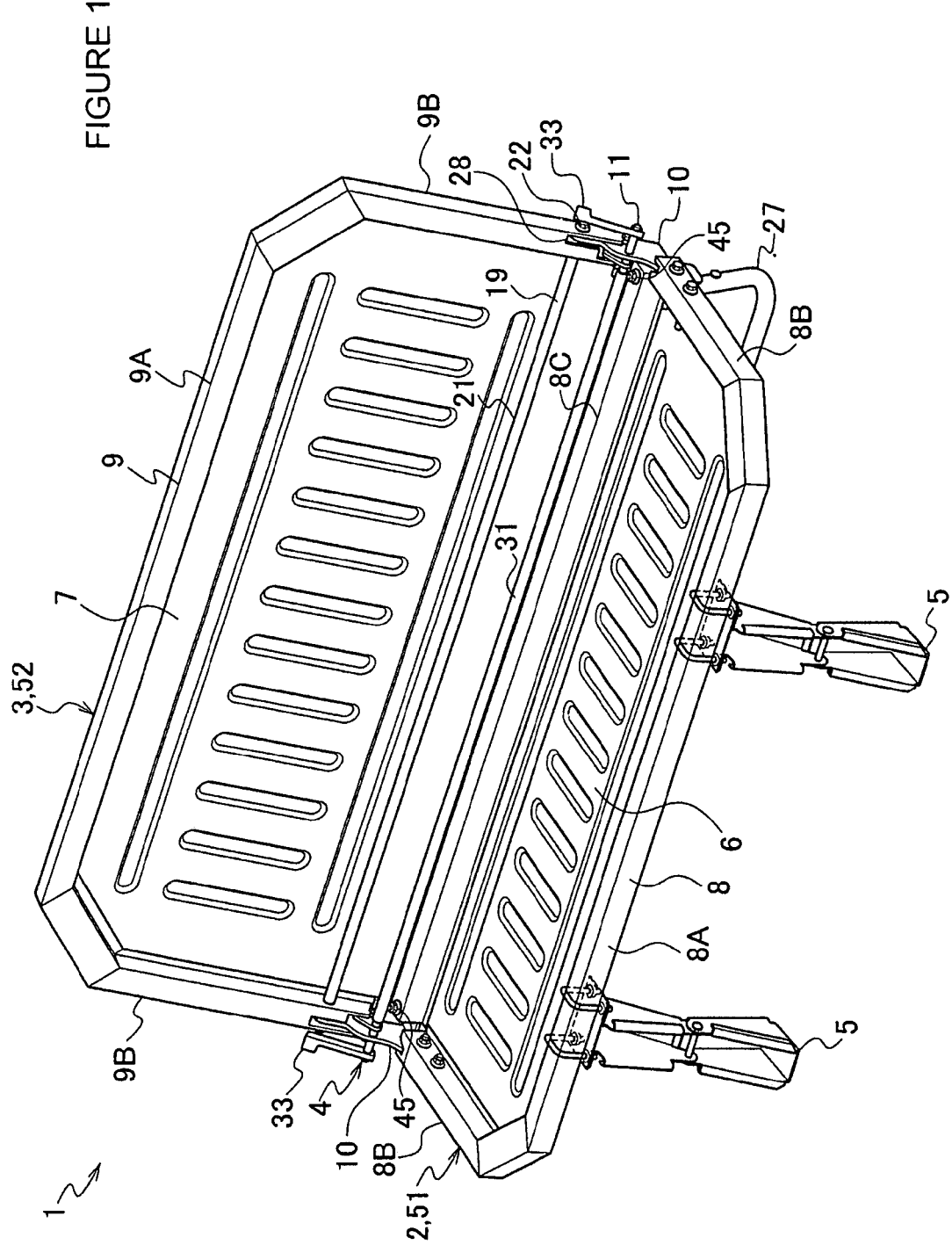
FIG. 1 is an oblique view illustrating the seat frame structure in accordance with an embodiment of the present invention.

In FIG. 1, the seat frame structure 1 is set in a seat having seat cushion 51 and seat back 52. The seat frame structure 1 has seat cushion frame 2 set on seat cushion 51 and seat back frame 3 set on seat back 52. The seat cushion frame 2 and seat back frame 3 are connected via a hinge structure 4 and supported via a front leg portion 5 on a vehicle body floor (not shown). In this way, for the rear bench seat having seat frame structure 1 set on it, when not in use, the entire rear bench seat may be folded so that it can be stored on the back surface side of a front seat (not shown).

The seat cushion frame 2 and seat back frame 3 may be formed in a nearly rectangular shape with about the same width on the major (longer) side of the rectangles. A pad (not shown) may be installed on the seat cushion frame 2 and/or the seat back frame 3.

The seat cushion frame 2 and seat back frame 3 have a structure that has panel portions 6, 7 and folded portions 8, 9 formed on the peripheral edge portions of the panel portions 6, 7. For seat cushion frame 2 and seat back frame 3 with the structure, the peripheral edge portion of an aluminum alloy or another foldable base material is bent back to the inner side to form folded portions 8, 9. The inner portions of folded portions 8, 9 become panel portions 6, 7. The bent-back tip portions of folded portions 8, 9 are welded and bonded to panel portions 6, 7. The folded portions 8, 9 may be formed in a square-cross-sectional pipe shape with internal spaces in them.

Figure 6:
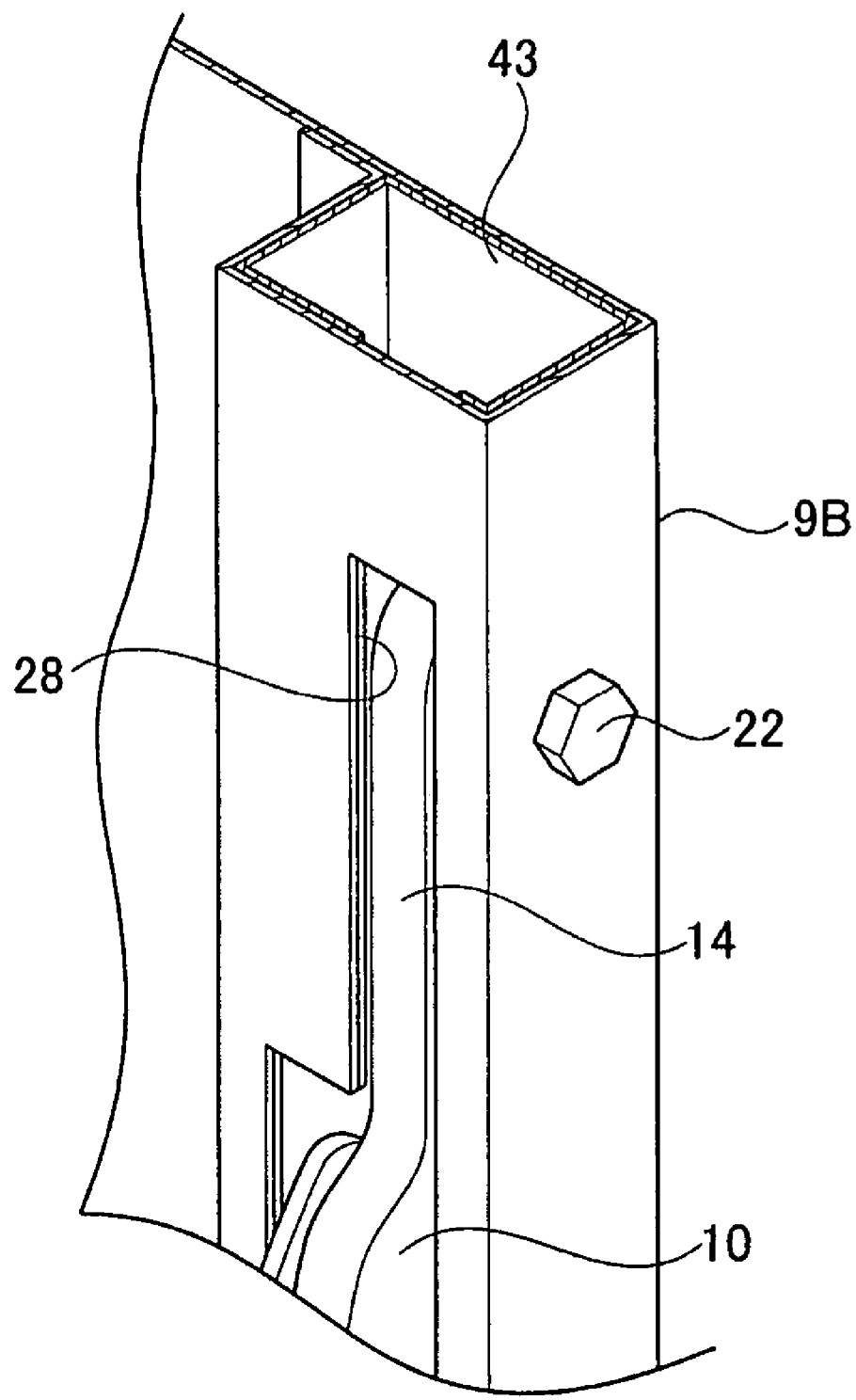
FIG. 6 is an oblique view as seen from a front side of a lower portion of the seat back frame in the seat frame structure of the embodiment shown in FIG. 1.

The folded portion 8 of seat cushion frame 2 has a front beam portion 8A that forms the front edge portion of seat cushion frame 2, side beam portions 8B as a pair of left/right first beam portions that form a side edge portion of seat cushion frame 2, and a rear beam portion 8C as a third beam portion that forms a rear edge portion of seat cushion frame 2. In the embodiment shown in FIG. 1, the folded portion 8 is formed around the perimeter of panel portion 6. The folded portion 9 of seat back frame 3 has an upper beam portion 9A that forms an upper edge portion of seat back frame 3 and side beam portions 9B as a pair of left/right second beam portions that form a side edge portion of seat back frame 3. The folded portion 8 is formed in a ]-shape with respect to panel portion 7, leaving a bottom edge portion of the panel portion 7 without a folded portion. A first reinforcing member 43 may be set inside the lower portion of side beam portions 9B, as shown in FIG. 6.

The rear beam portion 8C of seat cushion frame 2 may be set with a left/right width equal to or shorter than the opposite surfaces of side beam portions 8B, and may be set behind the pair of left/right side beam portions 8B. With such an arrangement, the rear side of the left/right pair of side beam portions 8B is opened, while rear beam portion 8C is opened on the left/right side surfaces. On the other hand, the left/right pair of side beam portions 9B of seat back frame 3 has the lower side opened.

In the following, an explanation will be given regarding the hinge structure 4. As shown in FIG. 1, the hinge structure 4 includes a left/right pair of connecting brackets 10 that connect seat back frame 3 in a freely rotatable way on seat cushion frame 2 with the seat back frame 3 positioned in a seating position. A lock mechanism 11 that locks seat back frame 3 in place may be installed at the seating position. Consequently, by means of connecting brackets 10, the seat is positioned in the seating position.

Because the left/right pair of connecting brackets 10 includes planar symmetric parts with respect to a plane perpendicular to a straight line in the left/right direction, a more detailed explanation will be given regarding connecting bracket 10 on the left side as an example. As shown in FIGS. 2-5, the connecting bracket 10 may include the following portions: a base portion 12, a first arm portion 13 extending forward from the base portion 12, a second arm portion 14 extending from the base portion 12 obliquely to the rear upper side, and a third arm portion 15 that extends from the base portion 12 to the inner side (right side) of the seat cushion frame 2.

Figure 2:
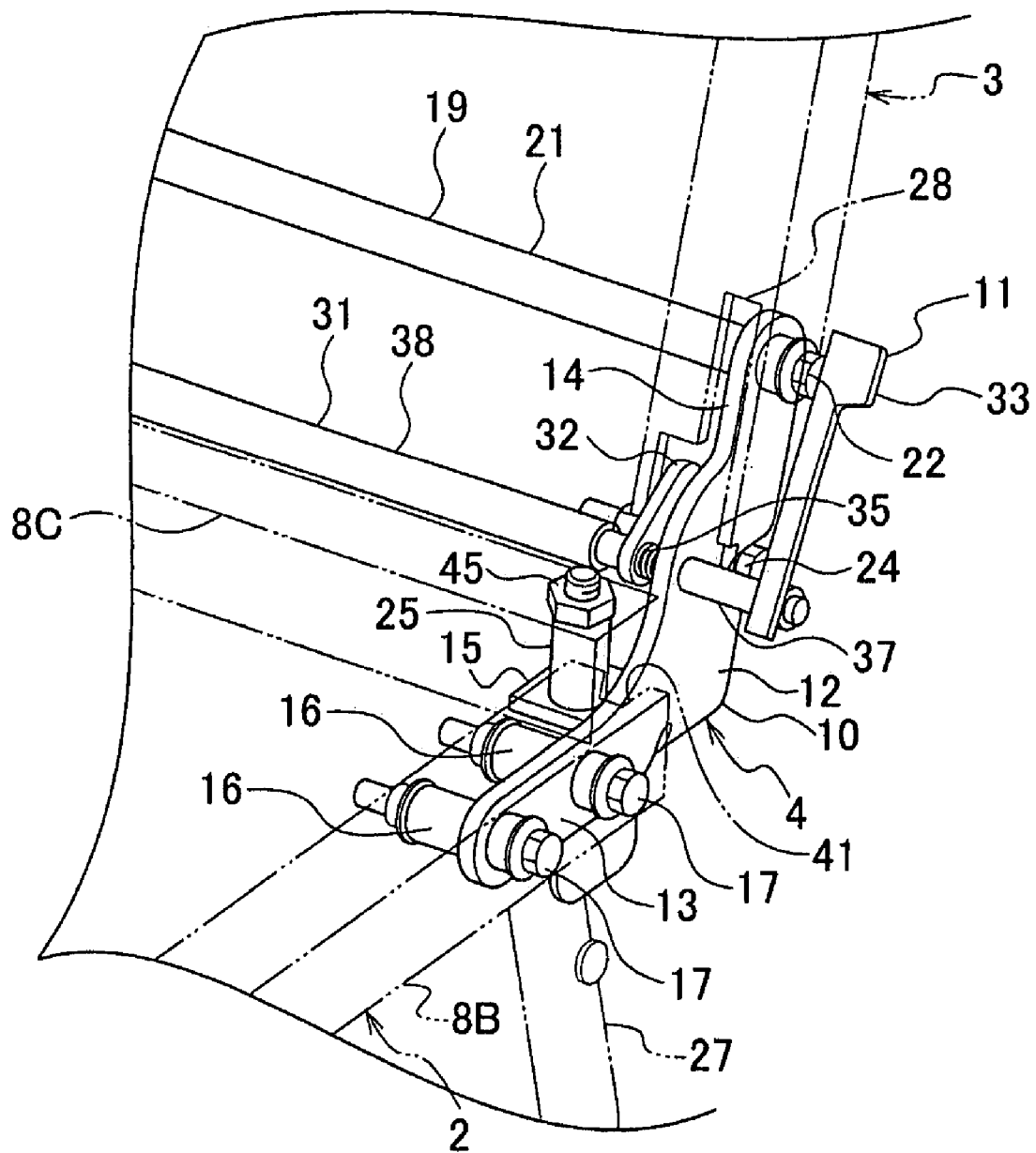
FIG. 2 is an oblique view illustrating an enlarged portion of a connecting structure between the seat cushion frame and the seat back frame shown in FIG. 1.
Figure 9:
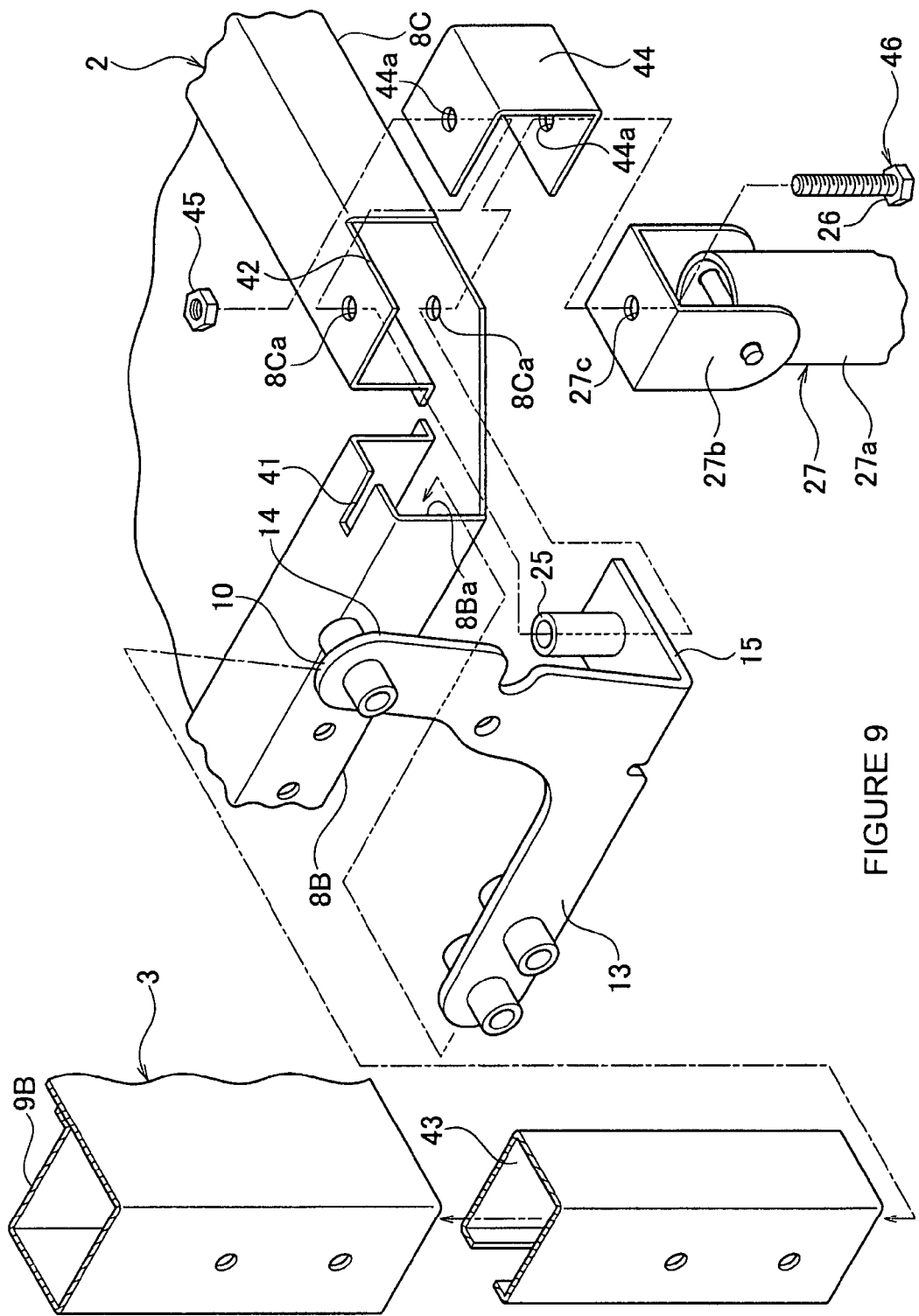
FIG. 9 is an exploded oblique view as seen from a rear side of a portion of the connecting structure between the seat cushion frame and the seat back frame of the embodiment 1 shown in FIG. 1.

The first arm portion 13 may be inserted into the interior (internal space) of the side beam portion (the left side beam portion in this specific example) 8B of seat cushion frame 2 and may be fixed on the side beam portion 8B. More specifically, on the first arm portion 13, two collars 16 with their axes aligned across the interior of the side beam portion are set apart and with their respective axes substantially parallel. On the side beam portion 8B, there is a through-hole (not shown) formed through the side beam portion 8B in the left/right direction and connected to collar 16. Then, a nut 18 may be screwed in the outer portion of side beam portion 8B on a bolt 17, which is set through the collar 16 and through side beam portion 8B. As a result, the collar 16 is held between the inner side surfaces of the left/right pair of the side beam portions 8B, and the first arm portion 13 is fixed on the side beam portion 8B. Here, as shown in FIG. 9, on the rear end of the side beam portion 8B, an opening 8Ba is formed. The opening 8Ba allows the first arm portion 13 to be inserted into the side beam portion 8B from the rear side. Also, as shown in FIG. 2, the first arm portion 13 is inserted into an upper notch portion 41 formed on the upper wall of the side beam portion 8B. The upper wall notch portion 41 is set connected to opening 8Ba of side beam portion 8B.

In the embodiment shown in FIG. 2, the second arm portion 14 is inserted from the lower side to the interior (internal space) of side beam portion 9B of the seat back frame 3, which is supported such that it can rotate around a first spindle 19 as a pivot. More specifically, on second arm portion 14, single collar 20 with left/right as the axial direction is set. On the other hand, on the pair of side walls of side beam portion 9B, through holes (not shown) connected to collar 20 are formed. The first spindle 19 goes through the through holes and collar 20 and through left/right side beam portions 9B, while it is set on the left/right pair of side beam portions 9B. The first spindle 19 includes a spindle main body 21 having a female thread formed on its two end portions and a bolt 22 that is inserted through collar 20 and screwed onto the spindle main body 21. In one embodiment, bushings (not shown) may be provided between the spindle main body 21 and the side beam portions 9B and between the head portion of bolt 22 and the side beam portions 9B. The bushings allow the first spindle 19 to rotate smoothly with respect to the second arm portion 14. A notch portion 28 may be formed on the side beam portions 9B to avoid interference between the side beam portions 9B and the second arm portion 14 when the seat back frame 3 is rotated around the first spindle 19.

Figure 3:
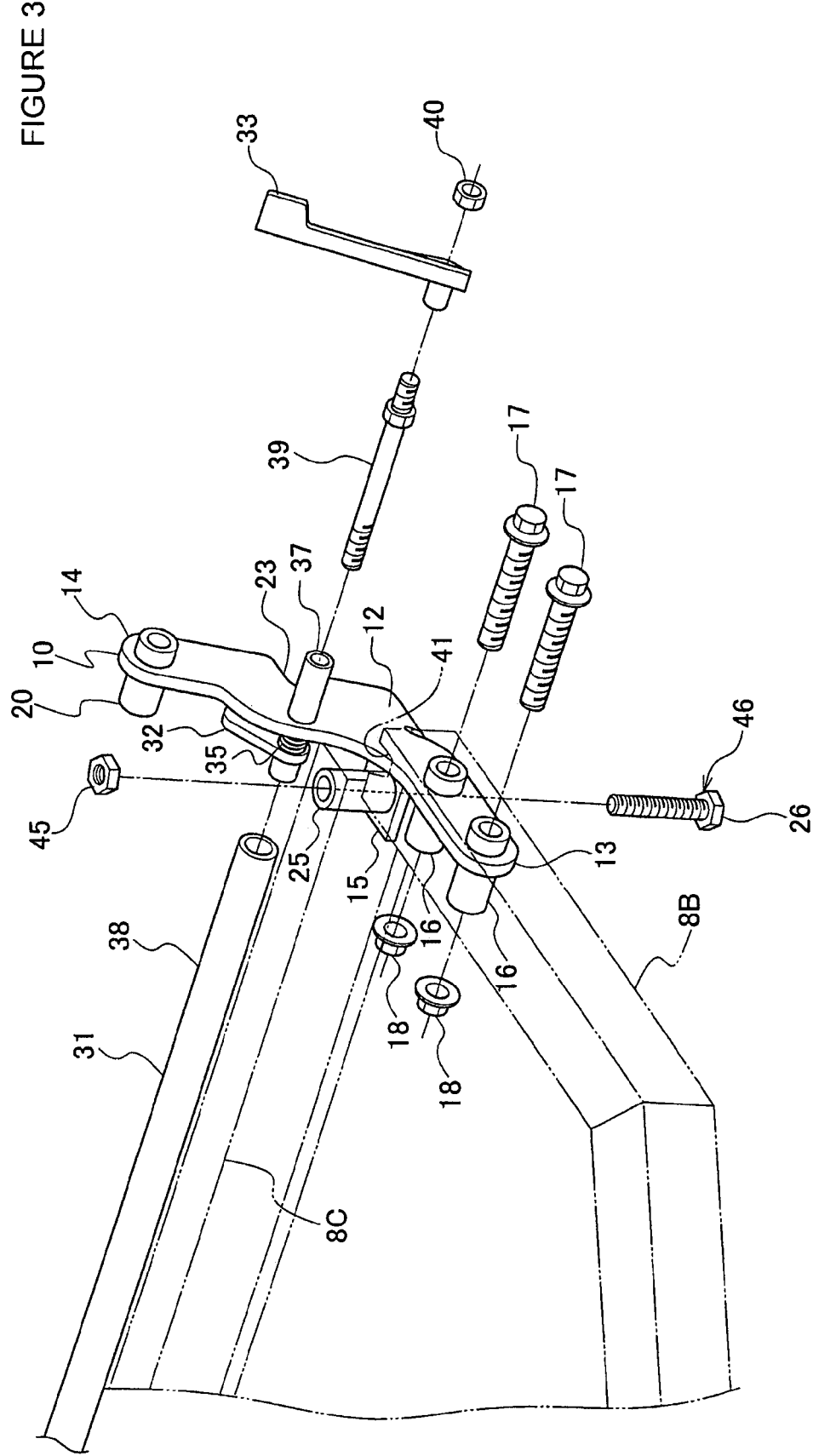
FIG. 3 is an exploded oblique view illustrating an enlarged portion of the connecting structure between the seat cushion frame and the seat back frame shown in FIG. 1.
Figure 4:
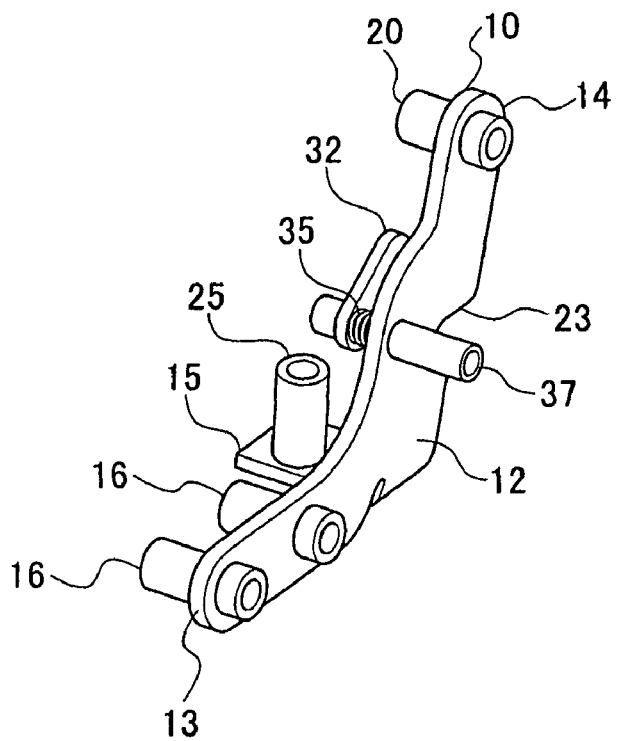
FIG. 4 is an oblique view illustrating an outer surface side of a connecting bracket of the embodiment shown in FIG. 1.

Turning to FIGS. 3 and 4, on a second arm portion 14, a notch portion 23 for positioning seat back frame 3 at the seating position may be set lower than the collar 20 and the first spindle 19. On the notch portion 23 for positioning, a pin 24 set on the lower end side with respect to first spindle 19 on side beam portion 9B is engaged, and the seat back is positioned in the seating position. The pin 24 is set through the side beam portions 9B with the left/right direction as the axial direction of the pin 24.

Figure 5:
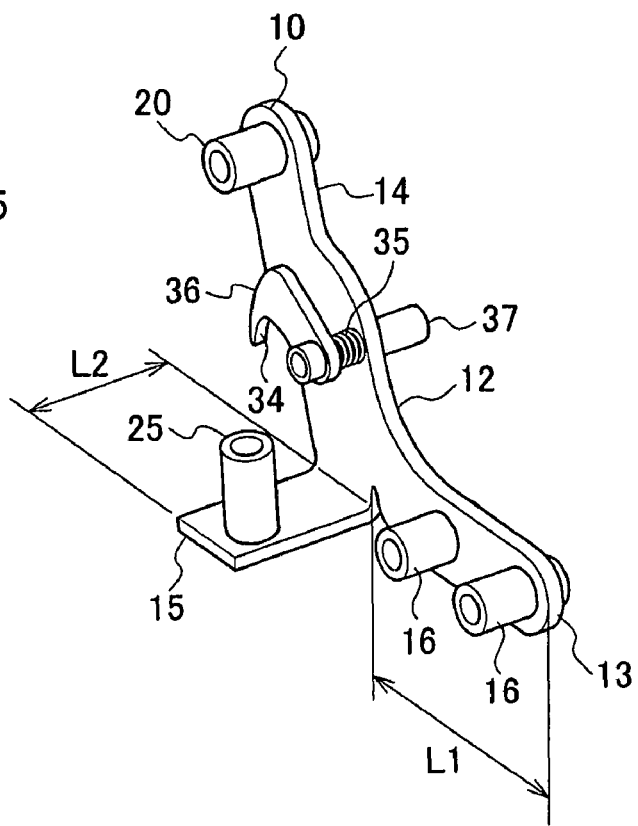
FIG. 5 is an oblique view illustrating an inner surface side of the connecting bracket of the embodiment shown in FIG. 1.

As shown in FIGS. 2 and 3, a third arm portion 15 may be inserted in the interior (internal space) of the rear beam portion 8C of the seat cushion frame 2. The third arm portion 15 may be fixed on the rear beam portion 8C. As shown in FIG. 5, length L1 of the third arm portion 15 may be shorter than length L2 of the first arm portion 13.

Figure 7:
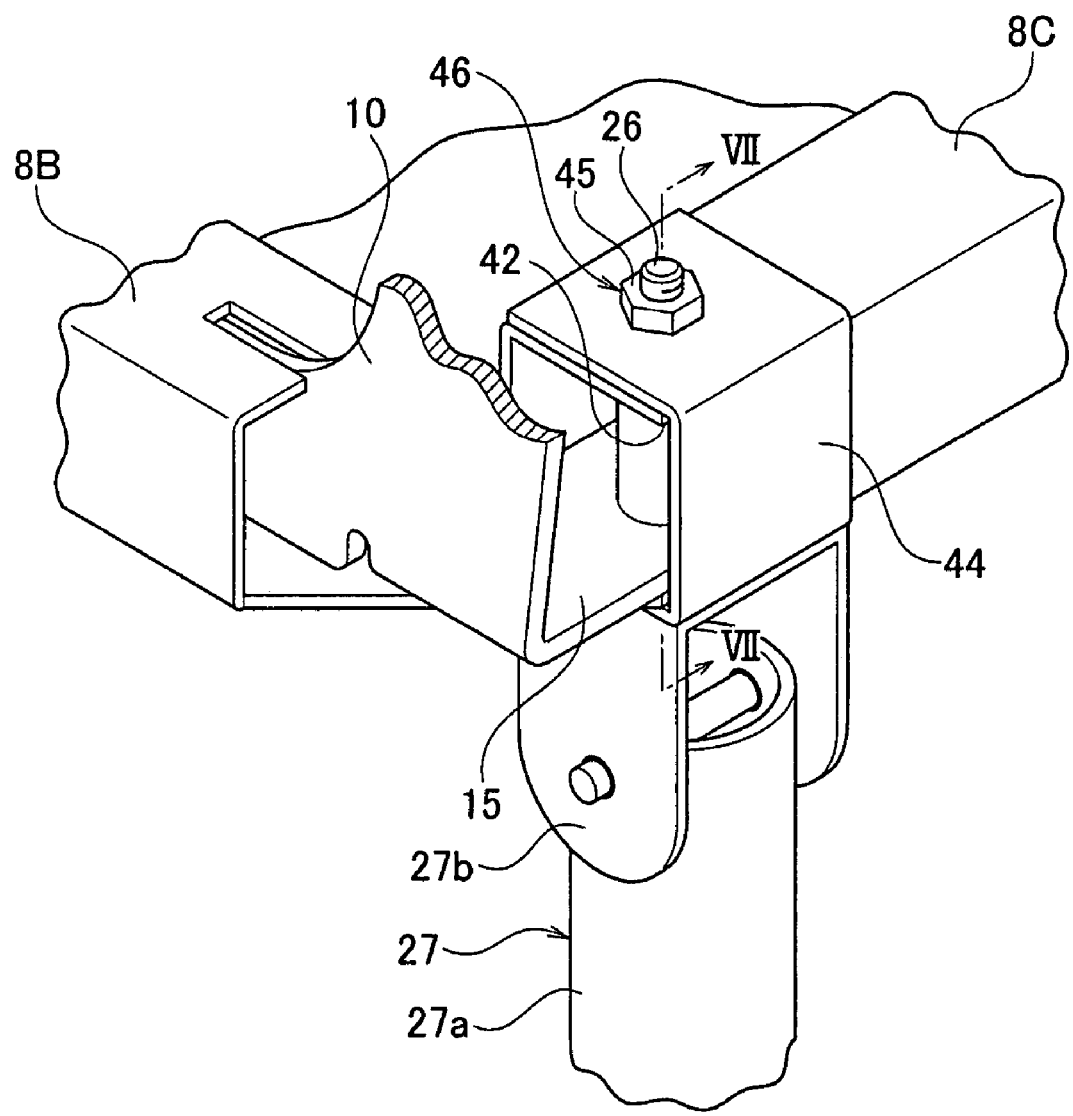
FIG. 7 is an oblique view as seen from a rear side of a rear corner portion of the seat cushion frame in the seat frame structure of the embodiment shown in FIG. 1.
Figure 8:
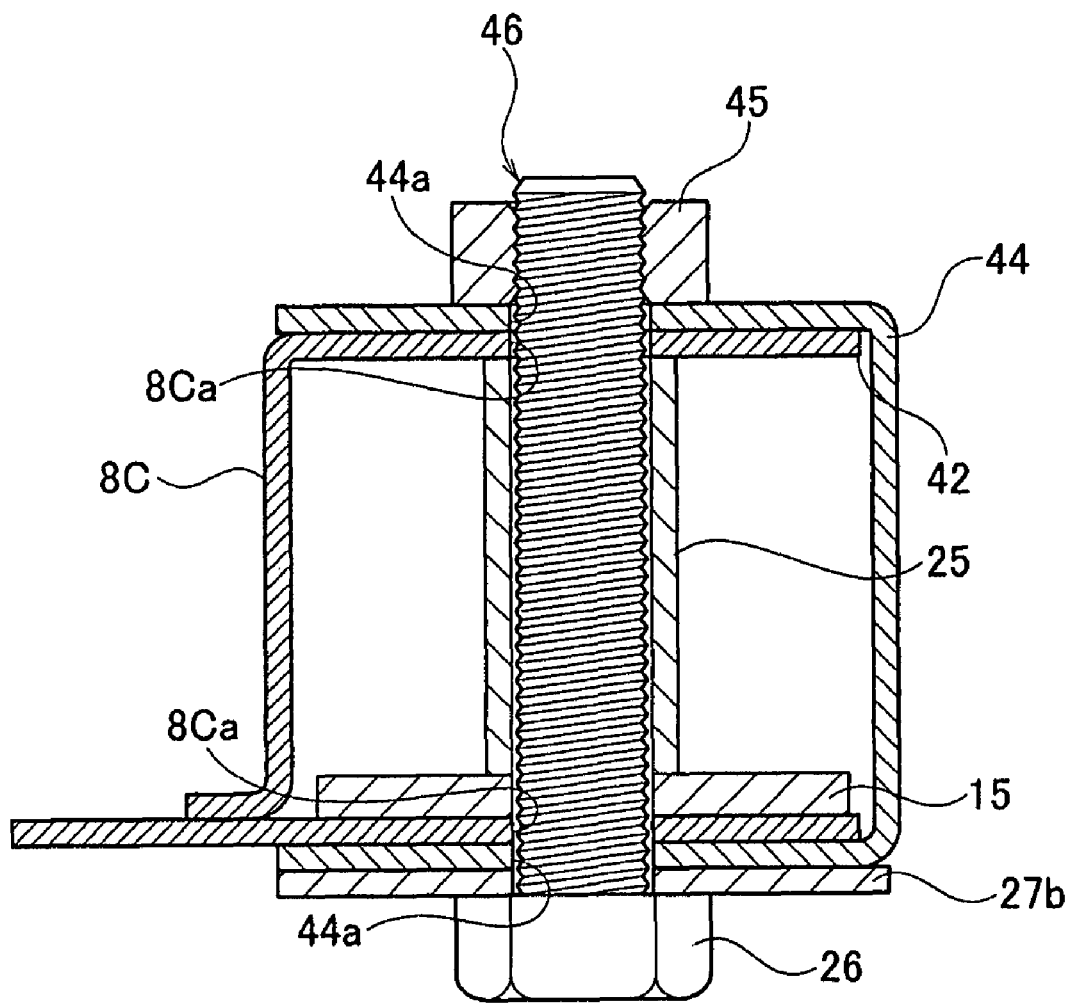
FIG. 8 is a cross-sectional view taken across line VII-VII in FIG. 7.

As shown in FIGS. 7-9, on the end portion in the left/right direction of rear beam portion 8C, a notch portion 42 may be formed to allow insertion of a third arm portion 15 from the rear side. As a result, the third arm portion 15 and the first arm portion 13 can be inserted in the rear beam portion 8C and the side beam portion 8B substantially simultaneously. Also, on rear beam portion 8C, a rear leg portion 27, which supports seat cushion frame 2, may be set near notch portion 42 and on the lower side of notch portion 42. Also, on rear beam portion 8C, a second reinforcing member 44 may be provided to reinforce the periphery of notch portion 42 and the portion where rear leg portion 27 in rear beam portion 8C is attached. The second reinforcing member 44 may be set while it covers notch portion 42. The rear leg portion 27 has a leg main body 27a in a pipe shape and a connecting member 27b connected to the leg main body 27a such that it can rotate with respect to rear beam portion 8C. In the embodiment shown in FIGS. 7-9, the second reinforcing member 44 is a panel member formed by bending into a ]-shape and fit on the rear beam portion 8C. Then, the connecting member of the rear leg portion 27 may be attached on the lower surface of the second reinforcing member 44.

Continuing with the embodiment shown in FIGS. 7-9, the third arm portion 15 may be fastened together with the rear leg portion 27 and second reinforcing member 44 by means of a bolt 26 and a nut 45 with respect to the rear beam portion 8C. More specifically, on the third arm portion 15, a collar 25 is formed with the up/down direction as the axial direction. On rear beam portion 8C, an upper/lower pair of first through holes 8Ca for joint fastening is formed through rear beam portion 8C in the up/down direction and is connected to collar 25. Also, on the leg main body 27a of the rear leg portion 27, a second through hole 27c for joint fastening is formed. On second reinforcing member 44, an upper/lower pair of third through holes 44a for joint fastening is formed. The bolt 26 passes through the first-third through holes for joint fastening 8Ca, 27c, 44a and collar 25 and through rear beam portion 8C. A nut (not shown) may then be screwed onto the outer portion (upper side) of the rear beam portion 8C. As a result, the third arm portion 15 is held between the upper/lower inner surfaces of the rear beam portion 8C in the portion of collars 16, and while third arm portion 15 is fixed on the rear beam portion 8C, the rear leg portion 27 and the second reinforcing member 44 are fixed on the rear beam portion 8C. Here, the bolt 26 and the nut 45 form a fastening structure 46. Also, the bolt 26 and the nut 45 may be swapped with each other in the up/down direction.

In the embodiment shown in FIGS. 1-3, the lock mechanism 11 includes a second spindle 31. This second spindle 31 is rotatably supported on a left/right pair of connecting brackets 10. On the second spindle 31, a hook 32 and a manipulating lever 33 are fixed. More specifically, the second spindle 31 may include the following parts: a left/right pair of collars 37 pivoted on the connecting brackets 10, a spindle main body 38 set between the collars 37 and with nut portions formed at its two ends, a left/right pair of bolts 39 inserted from the outside of the connecting brackets 10 into the collars 37 and screwed on the nut portions of spindle main body 38, respectively. A left/right pair of nuts 40 may be provided to fasten the manipulating lever 33 onto bolts 39.

As shown in FIGS. 2-5, a hook 32 may be set near and on the inner side of the connecting bracket 10. A left/right pair of hooks 32 is set. On each hook 32, a recess 34 is formed. The recess 34 is engaged with the pin 24 set on the beam portion 9B on the side of seat back frame 3. On the back side of recess 34 of hook 32, a guide portion 36 may be formed.

On the portion of the second spindle 31 between hook 32 and connecting bracket 10, a left/right pair of coil springs 35 may be inserted from outer side. In this embodiment, each of the coil springs 35 has one end portion fixed on the second spindle 31 and has the other end portion fixed on the connecting bracket 10. The second spindle 31 is energized in the direction in which the hook 32 is engaged with pin 24 (hereinafter to be referred to as "engagement direction").

The manipulating lever 33 is set on each of the left/right two end portions of the second spindle 31 protruding outward from connecting bracket 10. When manipulating lever 33 is manipulated, it is possible to release engagement of the left/right pair of hooks 32 and the pins 24 substantially simultaneously.

With the lock mechanism 11, when the manipulating lever 33 is manipulated so that the hook 32 is driven to rotate together with the second spindle 31 in the direction opposite the engagement direction, engagement of the hook 32 with the pin 24 is released, which allows the seat back frame 3 to fall forward and rotate around the first spindle 19. The hook 32 that is released with respect to the pin 24 is driven to rotate in the engagement direction while it is energized by the coil springs 35. However, by means of a stop mechanism (not shown), further rotation may be stopped in the engagement direction at a predetermined position. Then, while seat back frame 3 is driven to rotate from the forward falling state to the seated position, the pin 24 makes contact with the guide portion 36 of the hook 32, which in turn drives the hook 32 to rotate in the direction opposite the engagement direction. The pin 24 then moves into the recess 34 of the hook 32. Finally, due to the energizing force of coil springs 35, the pin 24 and the recess 34 of hook 32 are engaged with each other. As a result, the seat back frame 3 is locked in the seated position.

In one embodiment, the seat frame structure 1 may be assembled as follows. First, the connecting bracket 10, the seat cushion frame 2, and the seat back frame 3 are provided. Then, the first arm portion 136 of the connecting bracket 10 is inserted in and connected to the interior of the side beam portion 8B of the seat cushion frame 2. The third arm portion 15 of the connecting bracket 10 is inserted in and connected to the rear beam portion 8C of the seat cushion frame 2. The second arm portion 14 of the connecting bracket 10 is inserted in and connected to the interior of side beam portion 9B of seat back frame 3. As a result, seat cushion frame 2 and seat back frame 3 are connected to each other via the connecting bracket 10.

By inserting the first arm portion 13 and the second arm portion 14 of connecting bracket 10 the interior (internal space) of the side beam portion 8B of the seat cushion frame 2 and the side beam portion 9B of the seat back frame 3, it is possible to improve the freedom in design of the pad or other installed parts set on the side beam portions 8B of the seat cushion frame 2 and the side beam portions 9B of the seat back frame 3 because the connecting bracket 10 is mostly concealed within the seat cushion frame 2 and the seat back frame 3. Also, if the third arm portion 15 of the connecting bracket 10 is inserted in the interior (internal space) of the rear beam portion 8C of the seat cushion frame 2 and fixed on rear beam portion 8C, it is possible to increase the rigidity and strength of the seat cushion frame 2. As discussed above, the first arm portion 13-third arm portion 15 and collars 16, 20, 25 may be respectively set, and the arm portions 13, 14, 15 may be connected to the beam portions 8B, 9B, 8C by the bolts 17, 22, 26 that go through the interior of the collars 16, 20, 25 and through the beam portions 8B, 9B, 8C and the nuts (nut 18 for bolt 17) screwed onto the bolts 17, 22, 26 in the outer portions of beam portions 8B, 9B, 8C. In such an embodiment, a structure for positioning arm portions 13, 14, 15 on beam portions 8B, 9B, 8C is not necessary, which allows for a more simple structure for the beam portions 8B, 9B, 8C.

By forming the beam portions 8A, 8B, 8C, 9A, 9B with a square cross-sectional shape, positioning of the front leg portion 5, the rear leg portion 27, the pads, and other installed parts attached on various beam portions 8A, 8B, 8C, 9A, 9B is easier compared to that of a round cross-sectional shape.

As discussed above, for the connecting bracket 10, the seat back frame 3 may be supported such that it can rotate around first spindle 19 in the left/right direction of the seat. Also, on each side beam portion 9B of the seat back frame 3, the notch portion 28 may be formed to avoid interference between the second arm portion 14 of the connecting bracket 10 and the side beam portion 9B when the seat back frame 3 rotates. Consequently, when the seat back frame 3 rotates around the first spindle 19, interference of the side beam portions 9B with the second arm portion 14 can be avoided by notch portion 28.

On the rear end of side beam portions 8B of seat cushion frame 2, opening 8Ba may be formed to allow insertion of the first arm portion 13 of the connecting bracket 10 from the rear side. Upper notch portion 41 may be formed and connected to opening 8Ba. Consequently, compared with the case when upper notch portion 41 is not set, the first arm portion 13 of the connecting bracket 10 can be inserted deeper inside the side beam portion 8B of the seat cushion frame 2, which allows for a reduction in the size of the seat frame structure 1.

On the rear end of the side beam portions 8B of the seat cushion frame 2, the opening 8Ba may be formed to allow insertion of the first arm portion 13 of the connecting bracket 10 from the rear side, and the notch portion 42 may be formed on the rear beam portion 8C of the seat cushion frame 2 so that the third arm portion 15 of the connecting bracket 10 can be inserted from the rear side. Consequently, the third arm portion 15 and the first arm portion 13 can be inserted in the rear beam portion 8C and the side beam portions 8B from the rear side substantially simultaneously.

In an embodiment in which length L2 of the first arm portion 13 in the connecting bracket 10 is shorter than length L1 of the third arm portion 15, compared with the case when the length relationship is opposite the aforementioned, it is possible to reduce notch portion 42 for insertion of rear beam portion 8C of seat cushion frame 2.

In an embodiment in which the rear leg portion 27 and the third arm portion 15 of the connecting bracket 10 are jointly fastened on rear the beam portion 8C of the seat cushion frame 2 by means of fastening structure 46, compared with the case when the rear leg portion 27 and the third arm portion 15 of the connecting bracket 10 are separately fastened on the rear beam portion 8C of the seat cushion frame 2, it is possible to simplify the seat frame structure 1.

As discussed above, the second reinforcing member 44 may reinforce the periphery of the notch portion 42 of the seat cushion frame 2 and the portion where the rear leg portion 27 is attached while it covers the notch portion 42. As a result, compared with the case in which individual members are used as the member covering the notch portion 42, the member for reinforcing the periphery of the notch portion 42 of the rear beam portion 8C, and the member for reinforcing the portion where the rear leg portion 27 is attached on the rear beam portion 8C, it is possible to simplify the seat frame structure 1.

In the following, with reference to FIGS. 10-12, an explanation will be given regarding a connecting structure in accordance with another embodiment of the present invention. The same part numbers as those adopted in the embodiments discussed above are adopted, and they will not be explained again. FIG. 1C is a horizontal cross-sectional view illustrating the connecting structure between the first arm portion of the connecting bracket and the seat cushion frame. FIG. 11 is an exploded oblique view illustrating the connecting structure between the first arm portion of the connecting bracket and the seat cushion frame. FIG. 12 is a diagram illustrating the connecting structure between the first arm portion of the connecting bracket and the seat cushion frame.

Figure 10:
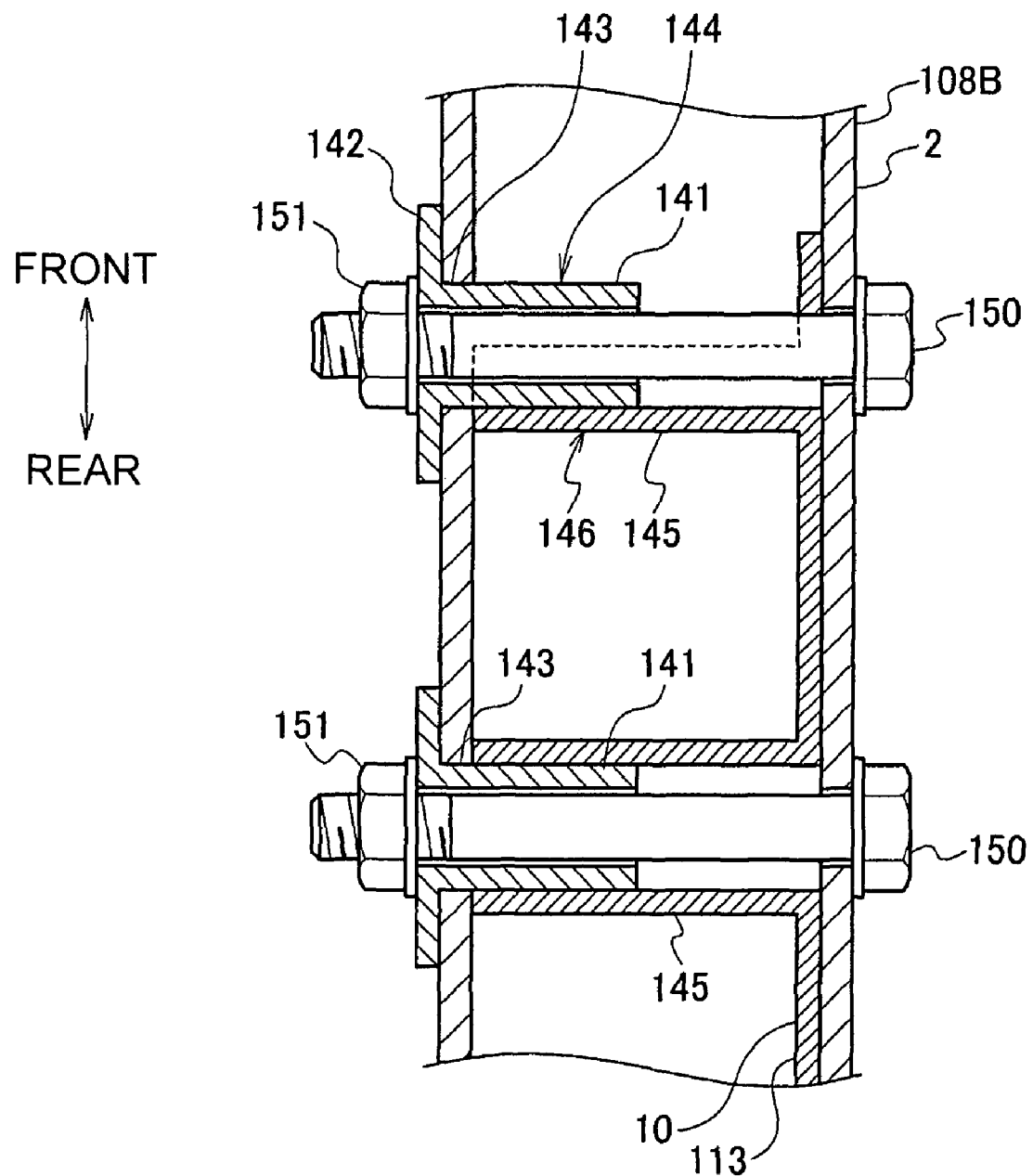
FIG. 10 is a horizontal cross-sectional view illustrating a connecting structure between a first arm portion of a connecting bracket and a seat cushion frame in accordance with an embodiment of the present invention.
Figure 11:
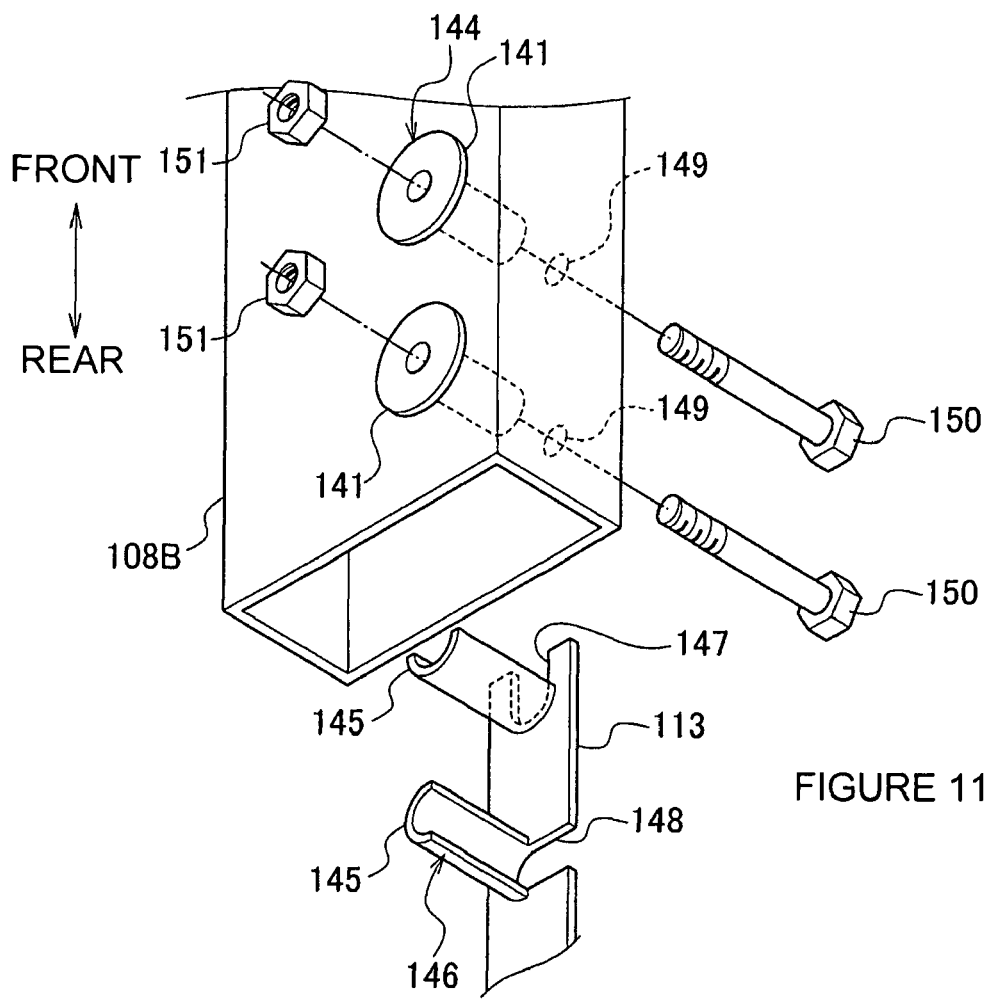
FIG. 11 is an exploded oblique view illustrating the connecting structure between the first arm portion of the connecting bracket and the seat cushion frame of the embodiment shown in FIG. 10.
Figure 12:
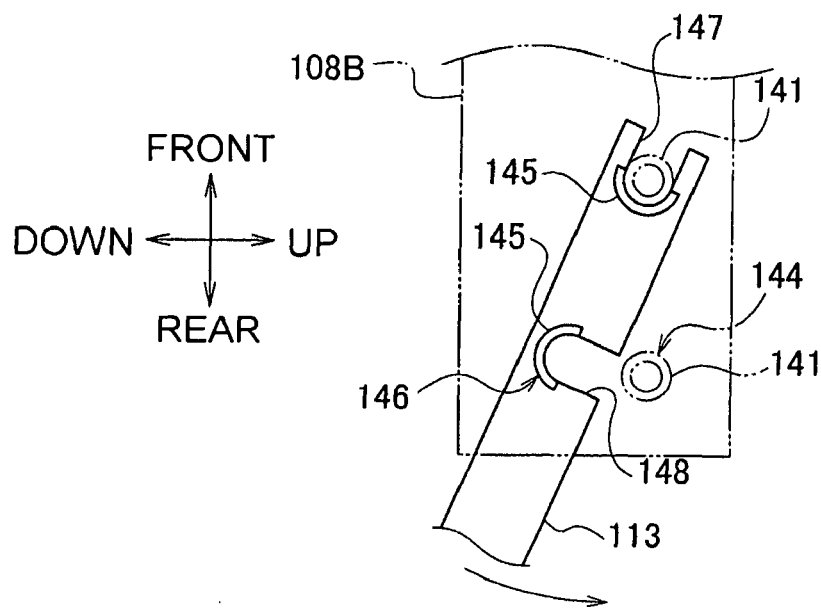
FIG. 12 is a diagram illustrating the connecting structure between the first arm portion of the connecting bracket and the seat cushion frame of the embodiment shown in FIG. 10.

Compared to the embodiments described with respect to FIGS. 1-9, the embodiment shown in FIGS. 10-12 differs in that the fixing structure of the first arm portion 113 is different from that of the side beam portion 108B of the seat cushion frame 2.

As shown in FIGS. 10-12, on the side beam portion 108B of the seat cushion frame 2, two positioning pins 141 with the left/right direction as the axial direction are set side-by-side with respect to the front/rear direction. The positioning pins 141 are formed in a cylindrical shape. Each positioning pin 141 has a flange 142 formed on one end portion. While the positioning pins 141 are inserted into the side beam portion 108B via the through holes 143 formed on one side wall of the side beam portion 108B, the flange 142 is fixed on the outer surface of the side beam portion 108B. The positioning pins 141 form a positioning portion 144. Also, the through holes 149 are formed coaxially with the through-holes 143 on the other side wall of the side beam portion 108B.

On the first arm portion 113 of connecting bracket 10, two engagement pieces 145 may be set side-by-side in the front/rear direction with the left/right direction taken as the axial direction. The engagement pieces 145 form engagement portion 146. The engagement pieces 145 may be formed in a curved plate shape with a semi-circular arc cross-sectional shape. The engagement piece 145 on the front side is set with the curved inner surface facing forward, while the engagement piece 145 on the rear side is set with the curved inner surface facing upward.

On the first arm portion 113, front and rear notch portions 147, 148 are formed connected to the inner surface of engagement pieces 145. The front-side notch portion 147 connected to front-side engagement piece 145 is opened towards the front side, while rear-side notch portion 148 connected to rear-side engagement piece 145 is opened towards the upper side.

In the following, an explanation will be given regarding the engagement between the positioning pins 141 of the side beam portion 108B and the engagement pieces 145 of the first arm portion 113, including the procedure of their engagement operation. First, the first arm portion 113 is inserted from the rear side obliquely downward with respect to the side beam portion 108B. The inner surface of the front-side engagement piece 145 is in contact with the front-side positioning pin 141, as shown in FIG. 12. Then, the connecting bracket 10 may be rotated upward around the front-side positioning pin 141. The rear-side engagement piece 145 then makes contact with the rear-side positioning pin 141 from the lower side. In this state, the positioning pins 141 of the side beam portion 108B are engaged with the engagement pieces 145 of the first arm portion 113. As a result, the first arm portion 113 is positioned with respect to the side beam portion 108B by means of the engagement portion 146 and the positioning portion 144. Then, the bolt 150 is inserted via the through-hole 149, the front-side notch portion 147, the rear-side notch portion 148, the positioning pin 141, and the through-hole 149. Then, the nut 151 is screwed onto the bolt 150, so that the first arm portion 113 is fastened on the side beam portion 108B, as shown in FIG. 10.

In the embodiment shown in FIGS. 10-12, since the positioning portion 144 is set monolithically with the side beam portion 108B, positioning of the first arm portion 113 with respect to the side beam portion 108B is easily done.

The present invention is not limited to the above-described embodiments, and various modifications can be made having the benefit of the present disclosure. For example, in the above-described embodiments, the explanation was with reference to the case of a bench seat for seating of plural persons.

However, those having ordinary skill in the art will appreciate that a seat for a single person may be made in accordance with one or more of the above-described embodiments without departing from the scope of the present invention. Also, the present invention is not limited to seats for vehicles.

In the above-described embodiments, the explanation was for examples in which the seat back frame is set by means of the connecting bracket so that it can rotate freely with reference to seat cushion frame. However, one of ordinary skill in the art, having benefit of the present disclosure, may also adopt a scheme in which the seat back frame is fixed by the connecting bracket with respect to the seat cushion frame. In such an embodiment, the second arm portion and the connecting bracket may be connected by means of the same connecting structure as that between the first arm portion and the connecting bracket. As a result, in this case, too, connecting bracket enters a state such that the seat is provided in the sitting position.

In the above-described embodiments, the explanation was for examples in which the side beam portions 8B, 108B (first beam portions), the side beam portions 9B (second beam portions), and the connecting brackets are set as a left/right pair. However, one of ordinary skill in the art, having benefit of the present disclosure, may also adopt a scheme in which the side beam portion 8B, 108B (first beam portion), the side beam portion 9B (second beam portion), and the connecting bracket 10 are set only on the left side or the right side.

In the following, an explanation will be given regarding a reference example with reference to FIG. 13, which is a cross-sectional view illustrating the main portion of the connecting structure between the second spindle and the seat back frame in this reference example.

In this reference example, the second spindle 219 of the lock mechanism 211 is also used as the frame structural member of the seat back frame 203. On the left/right side walls of the side beam portion 209B of the seat back frame 203, through-holes 204 are formed coaxially. The collars 205 are engaged with the through-holes 204. Also, inside the side beam portion 209B, the collar 206 is set coaxially with the through-holes 204 and fit between the two side walls.

On the two end portions of the second spindle 219, the bolt portions 207 are set. The bolt portions 207 go through the collars 205, 206, 205 and through the side beam portion 209B. Then, the nuts 208 are screwed onto the tip portions of the bolt portions 207 so that second spindle 219 is fastened on the side beam portion 209B. Also, in the embodiment shown in FIG. 13, the connecting bracket 210 is set on the outer side of the seat back frame 203. A manipulating lever 233 is provided.

Figure 13:
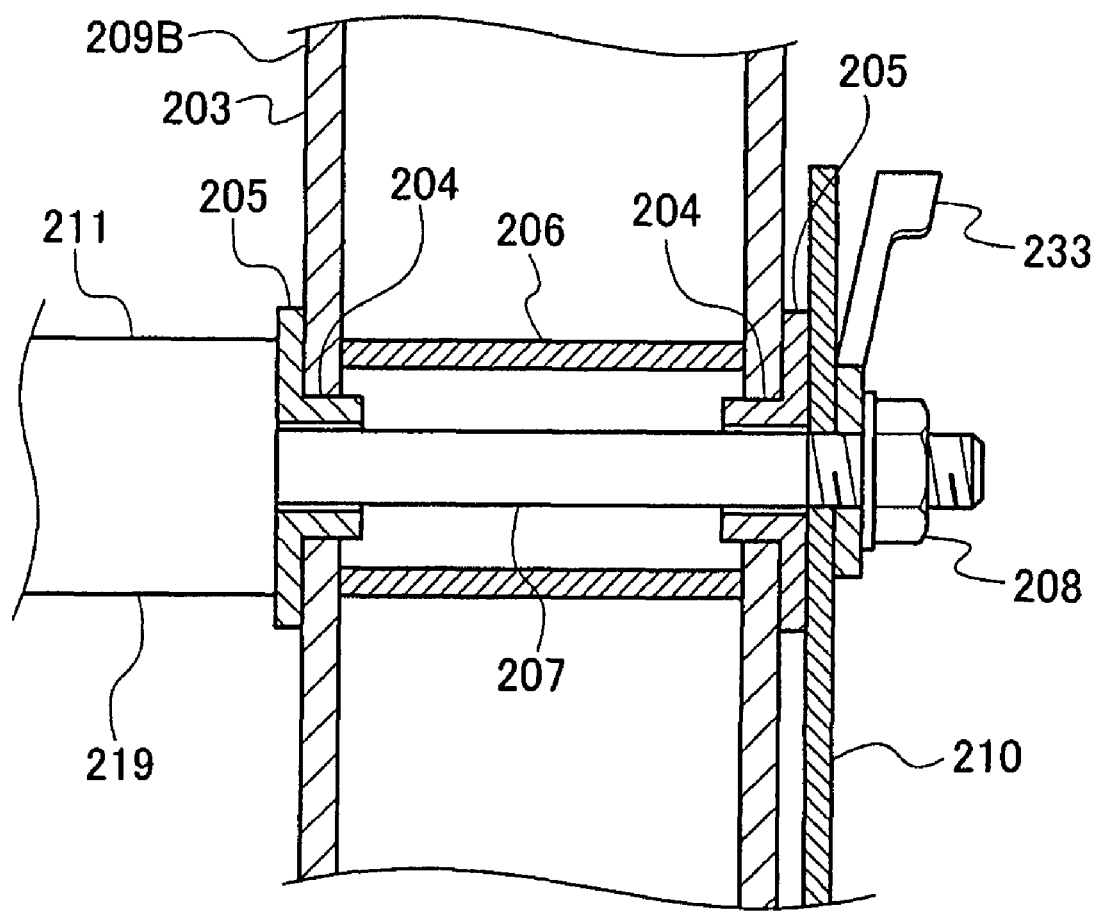
FIG. 13 is a cross-sectional view illustrating a main portion of a connecting structure between a second spindle and the seat back frame in accordance with an embodiment of the present invention.

In the embodiment shown in FIG. 13, since the second spindle 219 of the lock mechanism 211 is also used as a frame structural member of the seat back frame 203, the structure of seat back frame 203 is simplified and the strength of seat back frame 203 may be increased.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A seat frame structure comprising:
a seat cushion frame comprising a sheet of material forming a panel portion, a first beam portion, and a second beam portion, the first beam portion having an internal space in at least one of a left/right side edge portion of the sheet of material and the second beam portion having an internal space and forming a rear edge of the sheet of material;
a seat back frame comprising a third beam portion having an internal space in at least one of a left/right side edge portion; and
a connecting bracket comprising
a first arm portion inserted into the internal space of the first beam portion and connected to the first beam portion,
a second arm portion inserted into the internal space of the second beam portion and connected to the second beam portion, and
a third arm portion inserted in the internal space of the third beam portion and connected to the third beam portion;
wherein the connecting bracket connects the seat cushion frame to the seat back frame,
wherein the first arm portion, the second arm portion, and the third arm portion are substantially perpendicular to each other, and
wherein the first beam portion comprises a first folded portion of the sheet of material formed on a peripheral side edge portion of the panel portion, the second beam portion comprises a second folded portion of the sheet of material, the folded portions being formed in pipe shapes with the internal spaces therein.

2. The seat frame structure of claim 1, further comprising:
a collar set in at least one of the arm portions;
a bolt disposed in at least one of the beam portions that corresponds to the at least one of the arm portions having the collar, wherein the bolt goes through the collar; and
a nut screwed onto the bolt in an outer portion of the at least one of the beam portions.

3. The seat frame structure of claim 1, further comprising:
an engagement portion set on at least one of the arm portions, and
a positioning part set on at least one of the beam portions that corresponds to the at least one of the arm portions having the engagement portion, wherein the positioning part is configured to engage with the engagement portion to position the at least one of the arm portions.

4. The seat frame structure of claim 1, wherein each beam portion has a square cross-sectional shape.

5. The seat frame structure of claim 1, wherein the connecting bracket rotatably supports the seat back frame around a pivot along the left/right direction of the seat frame structure, and wherein, on the third beam portion, a notch portion is formed such that interference between the third arm portion and the third beam portion is avoided when the seat back frame is rotated.

6. The seat frame structure of claim 1, further comprising:
an opening formed on a rear end of the first beam portion and configured such that the first arm portion is able to be inserted therein; and
an upper wall notch portion formed on an upper wall of the first beam portion in which the first arm portion is inserted and connected to the opening.

7. The seat frame structure of claim 1, further comprising:
an opening formed on the rear end of the first beam portion and configured such that the first arm portion is able to be inserted therein; and
a notch portion formed on the second beam portion to allow insertion of the second arm portion from a rear side.

8. The seat frame structure of claim 7, further comprising:
a leg portion attached in the second beam portion near the notch portion, wherein the leg portion supports the seat cushion frame; and
a reinforcing member that reinforces the periphery of the notch portion in the second beam portion and where the leg portion is attached, wherein the notch portion is covered by the reinforcing member.

9. The seat frame structure of claim 1, wherein a length of the second arm portion is shorter than a length of the first arm portion.

10. The seat frame structure of claim 1, further comprising:
a leg portion supporting the seat cushion frame; and
a fastening structure that fastens the leg portion and the second arm portion together with the second beam portion.

11. A seat comprising the seat frame structure of claim 1.

12. A vehicle comprising the seat frame structure of claim 1.

13. A seat frame structure comprising:
a seat cushion frame comprising a sheet of material forming a panel portion, a first beam portion, and a second beam portion, the first beam portion having an internal space in at least one of a left/right side edge portion of the sheet of material and the second beam portion having an internal space and forming a rear edge of the sheet of material;
a seat back frame comprising a third beam portion having an internal space in at least one of a left/right side edge portion; and
means for connecting the internal space of the first beam portion, the second beam portion, and the third beam portion at substantially perpendicular angles,
wherein the first beam portion comprises a first folded portion of the sheet of material formed on a peripheral side edge portion of the panel portion, the second beam portion comprises a second folded portion of the sheet of material, the folded portions being formed in pipe shapes with the internal spaces therein.

* * * * *